United States Patent
Jeong et al.

(10) Patent No.: US 7,072,012 B2
(45) Date of Patent: Jul. 4, 2006

(54) LIQUID CRYSTAL DISPLAY DEVICE INCLUDING DATA LINE DIVIDED INTO FIRST AND SECOND BRANCH LINES AND METHOD OF FABRICATING THE SAME

(75) Inventors: Woo-Nam Jeong, Gyeongsangbuk-do (KR); Hyun-Suk Jin, Gyeonggi-do (KR); Won-Seok Kang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 135 days.

(21) Appl. No.: 10/812,054

(22) Filed: Mar. 30, 2004

(65) Prior Publication Data

US 2004/0227877 A1  Nov. 18, 2004

(30) Foreign Application Priority Data

May 12, 2003  (KR) ....................... 10-2003-0029824

(51) Int. Cl.
*G02F 1/1335* (2006.01)

(52) U.S. Cl. ...................................... 349/114
(58) Field of Classification Search ................ 349/43, 349/114

See application file for complete search history.

(56) References Cited

U.S. PATENT DOCUMENTS

2004/0201803 A1* 10/2004 Yang et al. .................. 349/114
2004/0239846 A1* 12/2004 Wen et al. ................... 349/114
2005/0018113 A1*  1/2005 Shen et al. .................. 349/114

* cited by examiner

*Primary Examiner*—Tarifur R. Chowdhury
(74) *Attorney, Agent, or Firm*—Morgan, Lewis & Bockius, LLP

(57) ABSTRACT

An array substrate for a liquid crystal display device includes: a substrate; a gate line on the substrate; a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; a thin film transistor connected to the gate line and the data line; a reflective electrode corresponding to the reflective portion and covering the first and second branch lines; and a transparent electrode corresponding to the transmissive portion and connected to the reflective electrode.

29 Claims, 9 Drawing Sheets

LIQUID CRYSTAL DISPLAY DEVICE INCLUDING DATA LINE DIVIDED INTO FIRST AND SECOND BRANCH LINES AND METHOD OF FABRICATING THE SAME

The present invention claims the benefit of Korean Patent Application No. 2003-29824, filed in Korea on May 12, 2003, which is hereby incorporated by reference.

BACKGROUND OF THE INVENTION

1. Field of the Invention

The present invention relates to a display device and a method of fabricating a display device, and more particularly, to a liquid crystal display device having a high aperture ratio and a high brightness, and a method of fabricating the same.

2. Discussion of the Related Art

In general, a transflective liquid crystal display (LCD) device can be switched from a transmissive mode using transmission of light to a reflective mode using reflection of light according to the user's selection. Since the transflective LCD device uses light from a backlight unit and ambient artificial or natural light, the transflective LCD device is not restricted by environmental light and has advantages, such as low power consumption and high brightness.

FIG. 1 is an exploded perspective view of a transflective liquid crystal display device according to the related art. In FIG. 1, a transflective liquid crystal display (LCD) device 11 includes a first substrate 21 and a second substrate 15, and a liquid crystal layer 23 interposed therebetween. The first substrate 21 and the second substrate 15 are spaced apart from each other and include a plurality of pixel regions "P" having a transmissive portion "A" and a reflective portion "C." A black matrix 16 and a color filter layer 17 including red, green and blue sub-color filters are formed on the second substrate 15. A common electrode 13 is formed on the black matrix 16 and the color filter layer 17.

A transparent pixel electrode 46 and a reflective electrode 40 are formed on the first substrate 21. The transparent pixel electrode 46 and the reflective electrode 40 correspond to the transmissive portion "A" and the reflective portion "C," respectively. A gate line 25 formed on the first substrate 21 crosses a data line 27 to define the pixel region "P." A thin film transistor (TFT) "T" of a switching element connected to the gate line 25 and the data line 27 is disposed in matrix.

The black matrix 16 corresponding to the gate line 25, the data line 27 and the TFT "T" is designed with an alignment margin. Alignment errors between the first substrate 21 and the second substrate 15 can be compensated within the alignment margin. Accordingly, the black matrix 16 is enlarged to accommodate the alignment margin.

FIG. 2 is a schematic cross-sectional view taken along a line "II—II " of FIG. 1 and FIG. 3 is a magnified cross-sectional view of a portion "E" of FIG. 2. In FIGS. 2 and 3, a thin film transistor (TFT) "T" including a gate electrode 8, an active layer 30, an ohmic contact layer 32, a source electrode 34 and a drain electrode 36 is formed on a first substrate 21. A first pixel region "P1" and a second pixel region "P2" both contain a transmissive portion "A" and a reflective portion "C." A transparent pixel electrode 46 is formed to correspond to both the transmissive portion "A" and the reflective portion "C." A reflective electrode 40 is formed in correspondence with the reflective portion "C." A data line 27 is formed in a portion between the reflective portion "C" and the second pixel region "P2." Although not shown in FIGS. 2 and 3, a gate line crosses the data line 27.

A color filter layer 17, including a red sub-color filter 17a, green sub-color filters 17b and a blue sub-color filter 17c, is formed in the pixel regions "P1" and "P2" on a second substrate 15 facing the first substrate 21. A black matrix 16 is formed to correspond to the data line 27. When a space between the adjacent reflective electrodes 40 over the data line 27 has a first distance "a" and a portion of the reflective electrodes 40 overlapping the data line 17 have a second distance "b," the black matrix 16 has a width "a+2b."

A uniform electric field is not sufficiently applied to a liquid crystal layer corresponding to the space between the adjacent reflective electrodes 40. Accordingly, the liquid crystal layer 23 (of FIG. 2) corresponding to the space between the adjacent reflective electrodes 40 has a light leakage even when a voltage corresponding to a black image is applied to the transparent pixel electrode 46 (of FIG. 2) in a normally white mode LCD device. Thus, the liquid crystal layer 23 (of FIG. 2) corresponding to the space between the adjacent reflective electrodes 40 would be shielded by the black matrix 16. Moreover, since the first substrate 21 and second substrate 15 can have an alignment error therebetween, the black matrix is designed to have the portion having the second distance "b" corresponding to the alignment margin. Accordingly, the black matrix 16 is enlarged and an effective area of the reflective portion "C" is reduced, thereby degrading aperture ratio and brightness.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide a liquid crystal display device having improved aperture ratio and brightness.

Another object of the present invention is to provide a method of fabricating a liquid crystal display device having improved aperture ratio and brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes: a substrate; a gate line on the substrate; a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; a thin film transistor connected to the gate line and the data line; a reflective electrode corresponding to the reflective portion and covering the first and second branch lines; and a transparent electrode corresponding to the transmissive portion and connected to the reflective electrode.

In another aspect, a fabricating method of an array substrate for a liquid crystal display device includes: forming a gate line on a substrate; forming a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; forming a thin film transistor connected to the gate line and the data line; forming a reflective electrode corresponding to the reflective portion and covering the first and second branch lines; and forming a transparent electrode corresponding to the transmissive portion and connected to the reflective electrode.

In another aspect, a liquid crystal display device includes: first and second substrates spaced apart from each other; a gate line on the first substrate; a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; a thin film transistor connected to the gate line and the data line; a reflective electrode corresponding to the reflective portion and covering the first and second branch lines; a transparent electrode corresponding to the transmissive portion and connected to the reflective electrode; a color filter layer on the second substrate; a common electrode on the color filter layer; and a liquid crystal layer between the reflective electrode and the common electrode.

In another aspect, a liquid crystal display device includes: first and second substrates spaced apart from each other; a gate line on the first substrate; a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; a thin film transistor connected to the gate line and the data line; a reflective electrode corresponding to the reflective portion and covering the first and second branch lines; a transparent electrode corresponding to the transmissive portion and connected to the reflective electrode; a color filter layer on the reflective electrode; a common electrode on the second substrate; and a liquid crystal layer between the color filter layer and the common electrode.

In another aspect, a fabricating method of a liquid crystal display device includes: forming a gate line on a first substrate; forming a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; forming a thin film transistor connected to the gate line and the data line; forming a reflective electrode corresponding to the reflective portion and covering the first and second branch lines; forming a transparent electrode corresponding to the transmissive portion and connected to the reflective electrode; forming a color filter layer on a second substrate; forming a common electrode on the color filter layer; attaching the first and second substrates such that the reflective electrode faces the common electrode; and forming a liquid crystal layer between the reflective electrode and the color filter layer.

In another aspect, a fabricating method of a liquid crystal display device includes: forming a gate line on a first substrate; forming a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively; forming a thin film transistor connected to the gate line and the data line; forming a reflective electrode corresponding to the reflective portion and covering the first and second branch lines; forming a transparent electrode corresponding to the transmissive portion and connected to the reflective electrode; forming a color filter layer on the reflective electrode; forming a common electrode on a second substrate; attaching the first and second substrates such that the color filter layer faces the common electrode; and forming a liquid crystal layer between the color filter layer and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRAED EMBODIMENTS

Reference will now be made in detail to the illustrated embodiments of the present invention, an example of which is illustrated in the accompanying drawings.

Figure 4:
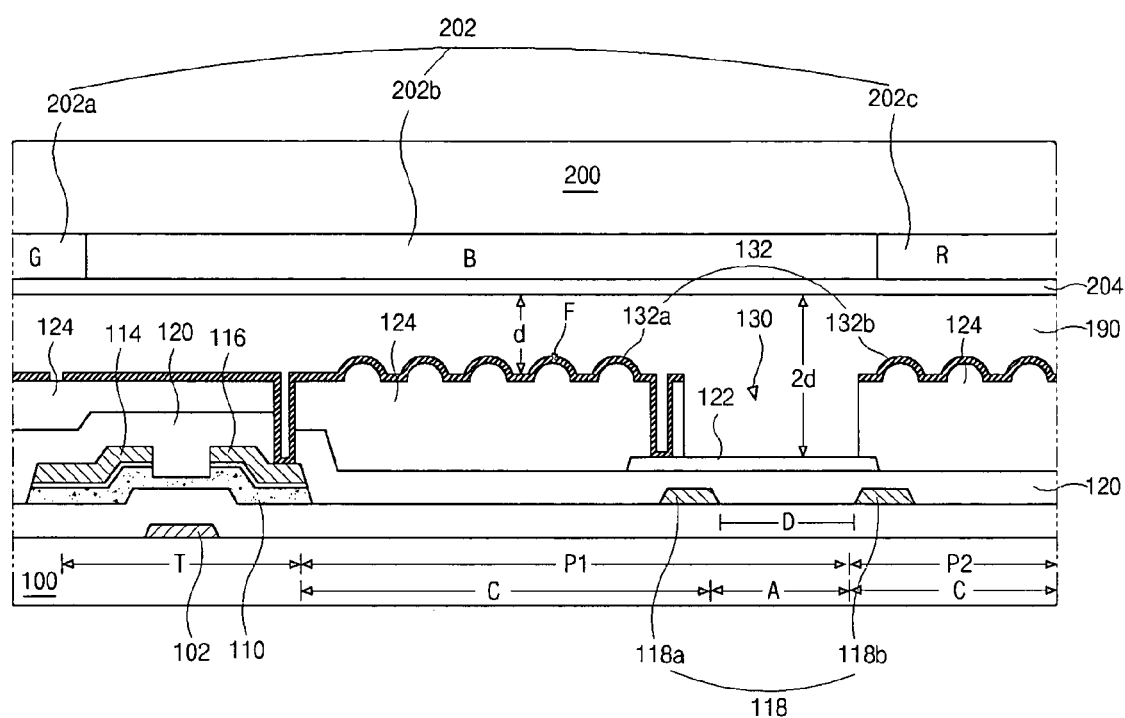
FIG. 4 is a cross sectional view of a liquid crystal display device according to a first embodiment of the present invention.

FIG. 4 is a cross sectional view of a liquid crystal display device according to a first embodiment of the present invention. As shown in FIG. 4, a first substrate 100 and a second substrate 200 can be disposed to face and be spaced apart from each other. A thin film transistor (TFT) "T" having a gate electrode 102, an active layer 110, a source electrode 114 and a drain electrode 116 are formed on an inner surface of the first substrate 100. In addition, a data line 118, including a first branch line 118a and a second branch line 118b, and a gate line (not shown) are formed on an inner surface of the first substrate 100. The data line 118 is connected to the source electrode 114, and is divided into first branch line 118a and a second branch line 118b at an end portion of the first substrate 100. The first branch line 118a and the second branch line 118b are spaced apart from each other to define a space "D." A width of the first branch line 118a can be the same as a width of the second branch line 118b. The gate line is connected to the gate electrode 102. The gate line and the data line 118 cross each other to define a first pixel region "P1" and a second pixel region "P2."

A first passivation layer 120 is formed on an entire surface of the first substrate 100 having the TFT "T" and the data line 118. A transparent electrode 122 is formed on the first passivation layer 120 to correspond to the space "D" between the first branch line 118a and the second branch line 118b. A second passivation layer 124 is formed on the transparent electrode 122.

A reflective electrode 132 connected to the drain electrode 116 and the transparent electrode 122 is formed on the second passivation layer 124. The reflective electrode 122 can include an unevenness to increase brightness along a slant angle and to prevent mirror reflection. The unevenness can be indirectly obtained by forming the second passivation layer 124 to have an uneven portion "F" at a surface thereof.

The reflective electrode 132 includes a first reflective electrode 132a in the first pixel region "P1" and a second reflective electrode 132b in the second pixel region "P2" adjacent to the first pixel region "P1." The first branch line 118a and the second branch line 118b are formed under the first reflective electrode 132a and the second reflective electrode 132b, respectively. Since the transparent electrode 122 connected to the drain electrode 116 is formed in the space "D" between the first branch line 118a and the second branch line 118b, light from a backlight unit (not shown) under the first substrate 100 passes through the space "D" and is emitted to exterior. Accordingly, the space "D" and the reflective electrode 132 corresponds to a transmissive portion "A" and a reflective portion "C," respectively. Each pixel region "P1" and "P2" includes the transmissive portion "A" and the reflective portion "C." The second passivation layer 124 can be formed to have a groove 130 corresponding to the transmissive portion "A" for a dual cell gap.

A color filter layer 202, including a red sub-color filter 202a, a green sub-color filter 202b and a blue sub-color filter 202c, is formed on an inner surface of the second substrate 200, and a transparent common electrode 204 is formed on the color filter layer 202. A liquid crystal layer 190 is formed between the reflective electrode 132 and the common electrode 204. When the second passivation layer 124 has the groove 130 corresponding to the transmissive portion "A," the liquid crystal layer 190 can have a first thickness "2d" in the transmissive portion "A" and a second thickness "d" in the reflective portion "C," wherein the first thickness "2d" is substantially twice as great as the second thickness "d."

In the first embodiment, since the data line 118 is formed under the reflective electrode 132 in the reflective portion "C" of the first region "P1" and the second pixel region "P2," a black matrix corresponding to the data line 118 can not be formed on the second substrate 200. Moreover, since the transparent electrode 122 is formed in the space "D" between the first branch line 118a and the second branch line 118b, a black matrix corresponding to the space "D" may not be necessary. In addition, since the space "D" between the first branch line 118a and the second branch line 118b is used as the transmissive portion "A," aperture ratio is further improved.

Figure 5:
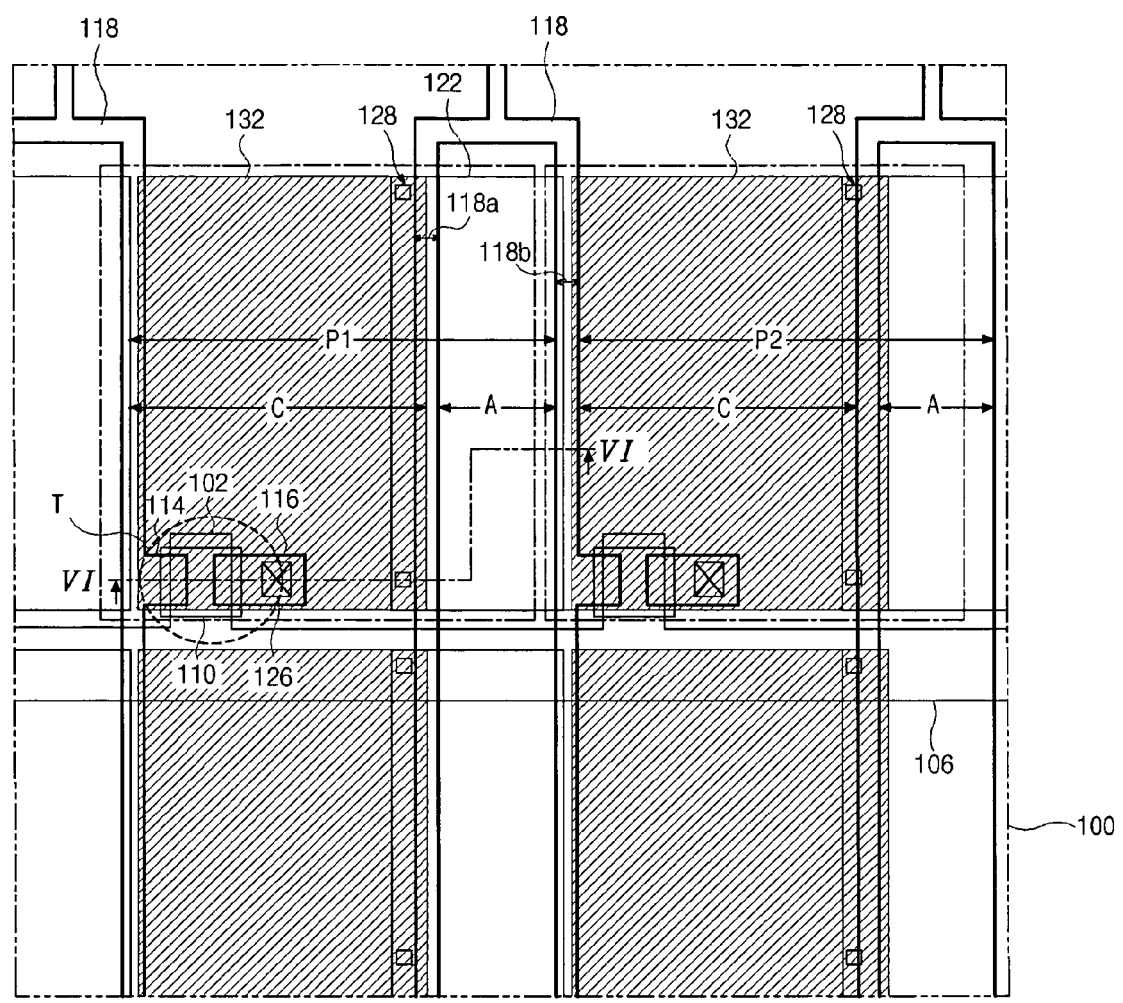
FIG. 5 is a plane view of an array substrate of a liquid crystal display device according to a first embodiment of the present invention.

FIG. 5 is a plane view of an array substrate of a liquid crystal display device according to a first embodiment of the present invention. As shown in FIG. 5, a gate line 106 and a data line 118 cross each other to define a first region "P1" and a second pixel region "P2" that both respectively include a transmissive portion "A" and a reflective portion "C." The data line 118 is divided into a first branch line 118a and a second branch line 118b at an end of a substrate 100. A thin film transistor (TFT) "T," including a gate electrode 102, an active layer 110, a source electrode 114 and a drain electrode 114, is formed near the crossing of the gate line 106 and the data line 118. The gate electrode 102 is connected to the gate line 106 and the source electrode 114 is connected to the data line 118. The source electrode 114 and the drain electrode 116 are spaced apart from each other.

Figure 1:
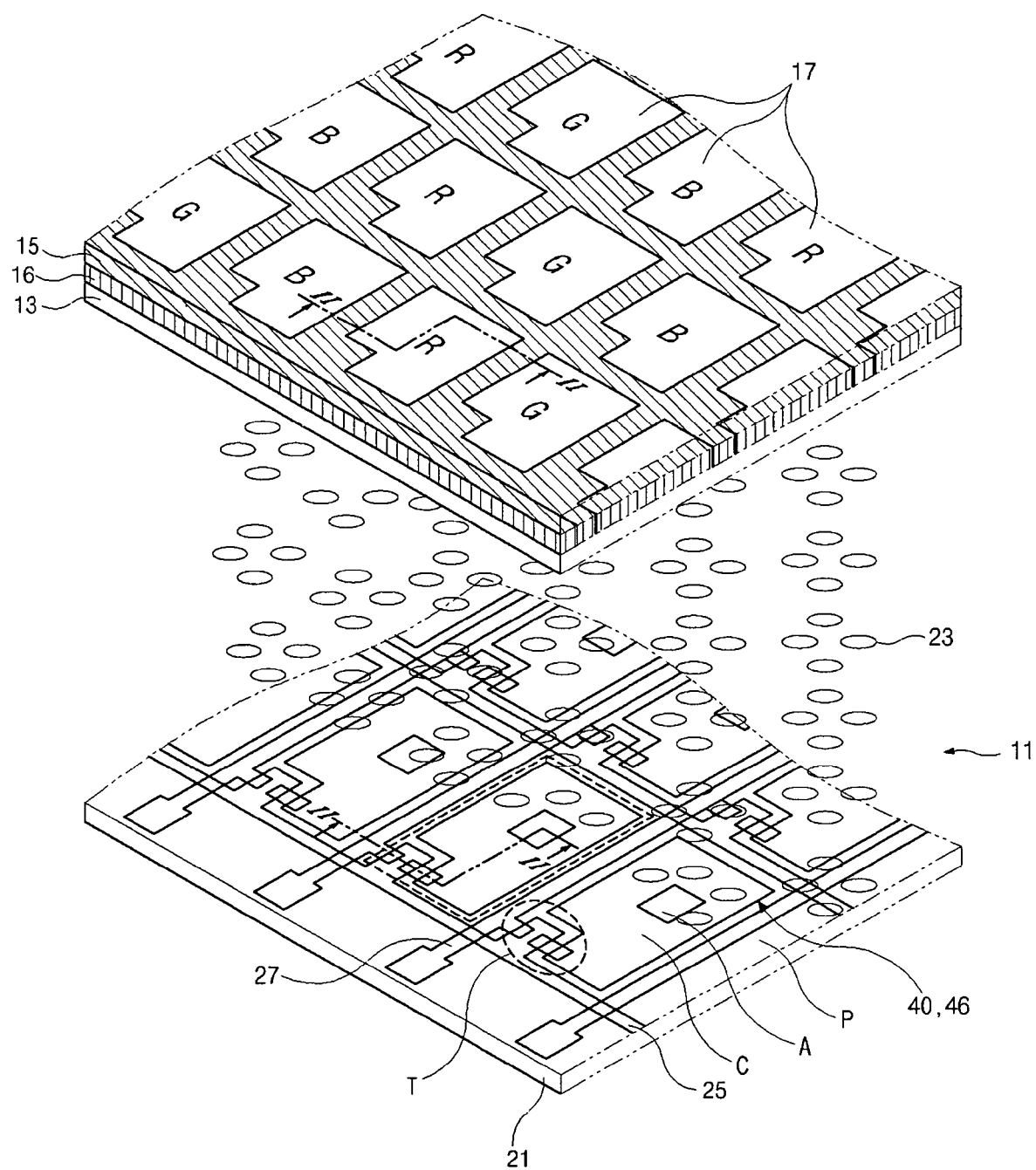
FIG. 1 is an exploded perspective view of a transflective liquid crystal display device according to the related art.
Figure 2:
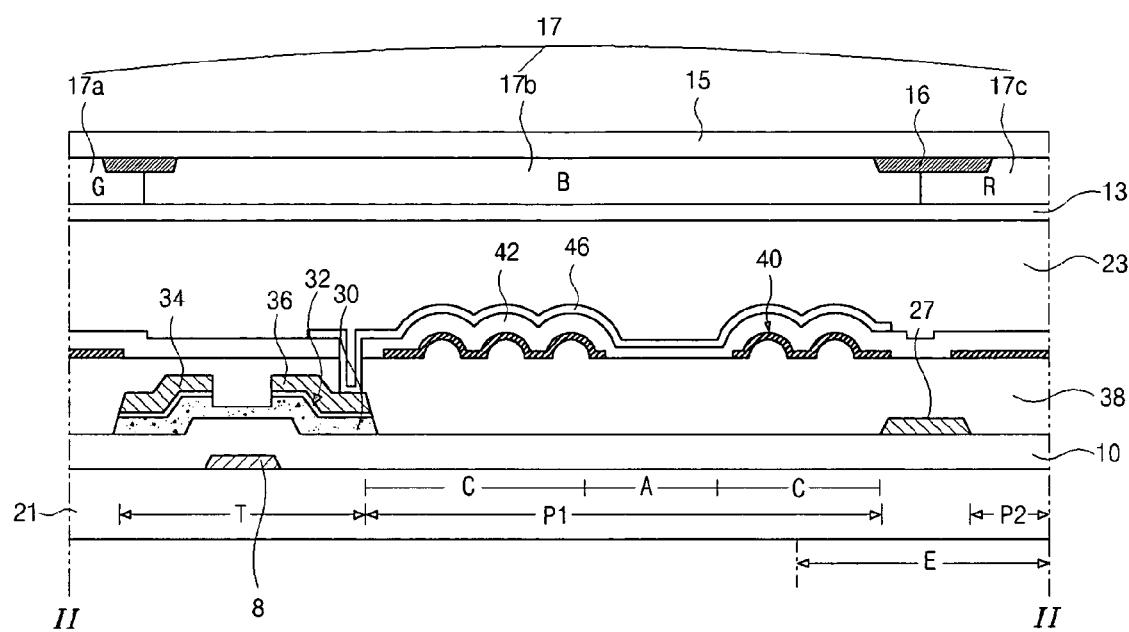
FIG. 2 is a schematic cross-sectional view taken along a line "II—II" of FIG. 1.
Figure 3:
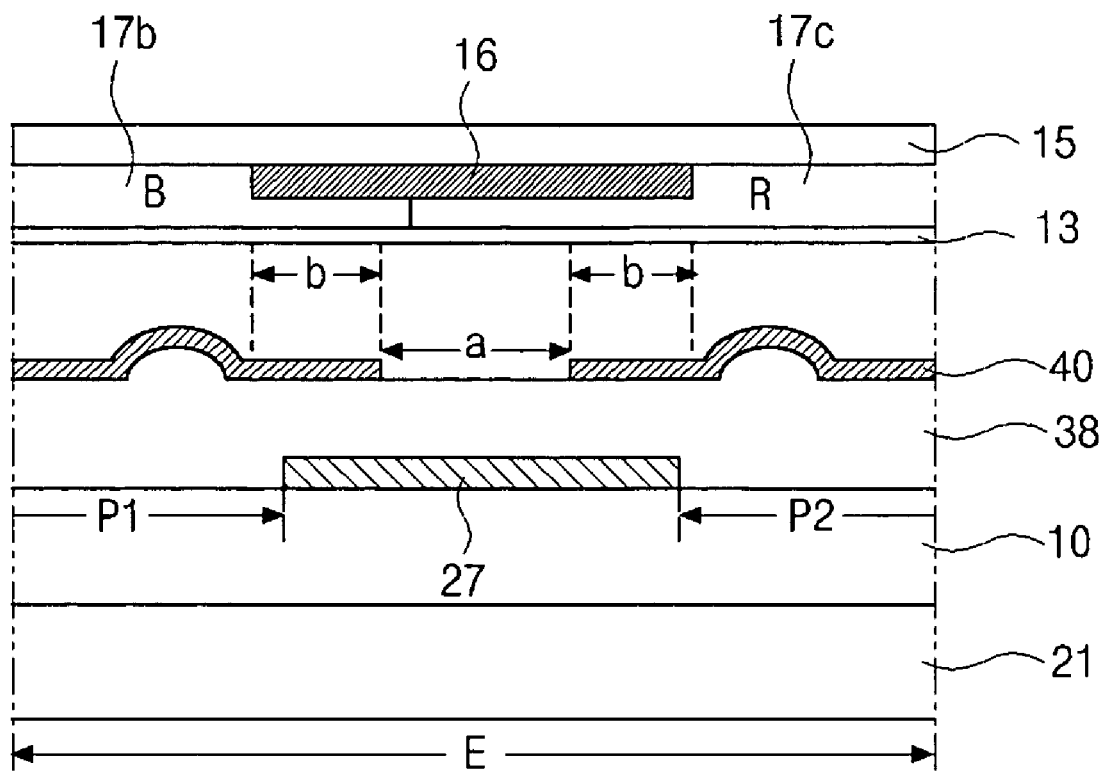
FIG. 3 is a magnified cross-sectional view of a portion "E" of FIG. 2.

A transparent electrode 122 is formed to correspond to the transmissive portion "A" of the first regions "P1" and the second pixel region "P2." A reflective electrode 132 having an unevenness (not shown) is formed to correspond to the reflective portion "C." The reflective electrode 132 is connected to the drain electrode 116 through a drain contact hole 126. Further, the reflective electrode 132 is connected to the transparent electrode 122 through a transparent electrode contact hole 128. The first branch line 118a and second branch line 118b are formed under the reflective electrodes in the first pixel region "P1" and the second pixel region "P2," respectively. Widths of the first branch line 118a and second branch line 118b can be determined such that a sum of the widths of the first branch line 118a and second branch line 118b is substantially the same as a width of the data line 27 discussed above in reference to FIG. 2 for an LCD device of the related art so as not to affect the resistance of the data line 118. In addition, a width of the first branch line 118a is substantially the same as a width of the second branch line 118b. Moreover, the first branch line 118a and second branch line 118b can have at least one connection pattern (not shown) connecting the first branch line 118a and second branch line 118b of one data line 118. Such a connection pattern can overlap the gate line 106.

In the first embodiment, since the data line 118 is formed under the reflective electrode 132 in the reflective portion "C" of both the first and second pixel regions "P1" and "P2," a black matrix corresponding to the data line 118 can be omitted. Moreover, since the transparent electrode 122 is formed in a space "D" between the first branch line 118a and second branch line 118b, a black matrix corresponding to the space "D" can also be omitted. In addition, since the space "D" between the first branch line 118a and second branch line 118b is used as the transmissive portion "A," aperture ratio and brightness are further improved.

Figure 6A:
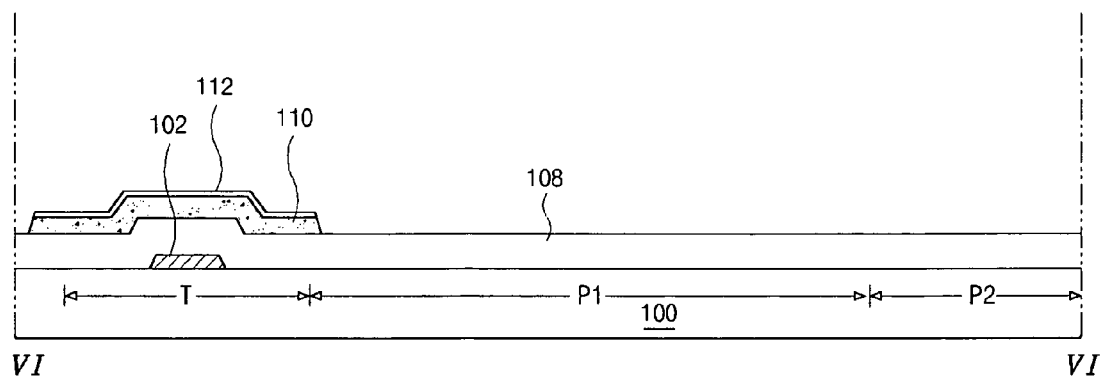
FIGS. 6A to 6D are cross-sectional views, which are taken along a line "VI—VI" of FIG. 5, showing a fabricating process of an array substrate for a liquid crystal display device according to a first embodiment of the present invention.

FIGS. 6A to 6D are cross-sectional views, which are taken along a line "VI—VI" of FIG. 5, showing a fabricating process of an array substrate for a liquid crystal display device according to a first embodiment of the present invention. As shown in FIG. 6A, a gate line 106, as described in reference to FIG. 5, and a gate electrode 102 are formed on a substrate 100. Since resistance of the gate line 106 causes an RC (resistance-capacitance) delay, a material having low resistance can be used for the gate line 106. For example, aluminum (Al) can be used for the gate line 106 to reduce RC delay. Pure aluminum (Al), however, has low chemical resistance and may cause line defects, such as a hillock, in a subsequent high temperature process. Accordingly, aluminum (Al) alloy, such as aluminum neodymium (AlNd), and a multiple layer including an aluminum layer, such as aluminum/molybdenum (Al/Mo), can be used for the gate line 106.

A gate insulating layer 108 is formed on an entire surface of the substrate 100 including the gate line 106 and the gate electrode 102. The gate insulating layer can include an inorganic material, such as silicon nitride ($SiN_x$) and silicon oxide (SiO$_2$). An active layer 110 of amorphous silicon (a-Si:H) and an ohmic contact layer 112 of impurity-doped amorphous silicon (n+a-Si:H) are sequentially formed on the gate insulating layer 108. The active layer 110 and the ohmic contact layer 112 have an island shape.

Figure 6B:
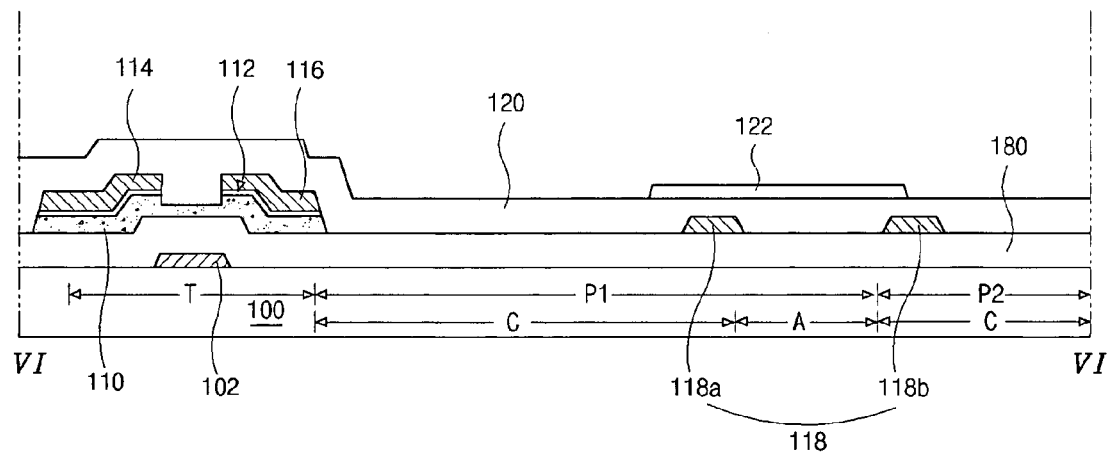

As shown in FIG. 6B, a source electrode 114 and a drain electrode 116 are formed on the ohmic contact layer 112 by depositing and patterning one of a conductive metal group including chromium (Cr), molybdenum (Mo), antimony (Sb) and titanium (Ti). At the same time, a data line 118 can be formed on the gate insulating layer 108. The data line 118 is connected to the source electrode 114 and crosses the gate line 106 to define a first pixel region "P1" and a second pixel region "P2" that both include a transmissive portion "A" and a reflective portion "C." The data line 118 is divided into a first branch line 118a and a second branch line 118b at one end of the substrate 100. The first branch line 118a and second branch line 118b are disposed in the reflective portions "C" of the adjacent first pixel region "P1" and the second pixel region "P2," respectively. The first branch line 118a and second branch line 118b can have at least one connection pattern (not shown) connecting the first branch line 118a and second branch line 118b of one data line 118. Such a connection pattern can overlap the gate line 106.

A first passivation layer 120 of an organic insulating material, such as benzocyclobutene (BCB) and acrylic resin, is formed on an entire surface of the substrate 100 including the source electrode 114, the drain electrode 116 and the data line 118. A transparent electrode 122 is formed on the first passivation layer 120 by depositing and patterning a transparent conductive material, such as indium-tin-oxide (ITO) and indium-zinc-oxide (IZO). The transparent electrode 122 can be formed to correspond to the transmissive portion "A," which is defined by a space between the first branch line 118a and second branch line 118b. The transparent electrode 122 extends such that one side of the transparent electrode 122 is formed in the reflective portion "C."

Figure 6C:
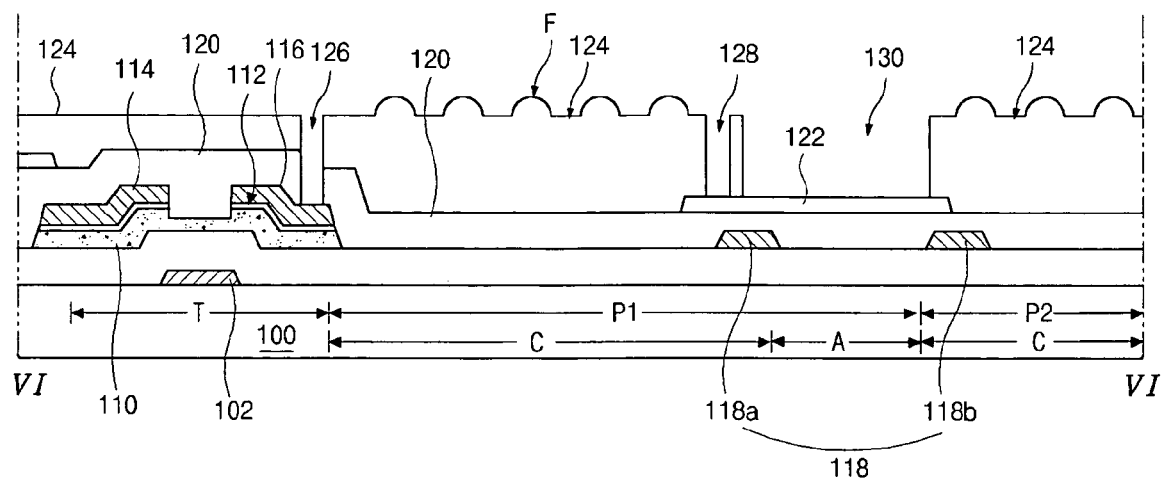

As shown in FIG. 6C, a second passivation layer 124 of an organic insulating material, such as benzocyclobutene (BCB) and acrylic resin, is formed on an entire surface of the substrate 100, including the transparent electrode 122. The second passivation layer 124 has an uneven portion "F" on its surface corresponding to the reflective portion "C." The uneven portion "F" can be obtained through several processes. For example, a first uneven pattern having a rectangular shape in a cross-sectional view can be formed by depositing and patterning a photosensitive resin. The first uneven pattern can be cured to become a second uneven pattern having a semi-spherical shape in a cross-sectional view.

A drain contact hole 126 exposing the drain electrode 116, a transparent electrode contact hole 128 exposing the transparent electrode 122 in the reflective portion "C" and a groove 130 exposing the transparent electrode 122 in the transmissive portion "A" are formed by patterning the first passivation layer 120 and the second passivation layer 124. The groove 130 corresponding to the transmissive portion "A" is formed to obtain a dual cell gap, where a first thickness "2d," as discussed above in reference to FIG. 4, (i.e., a first cell gap) in the transmissive portion "A" is substantially twice as great as a second cell gap "d," as also discussed above in reference to FIG. 4, (i.e., a second cell gap) in the reflective portion "C." In a structure having a dual cell gap, since the polarization property of the transmissive portion becomes similar to that of the reflective portion, color difference between the transmissive portion and the reflective portion is reduced.

Figure 6D:
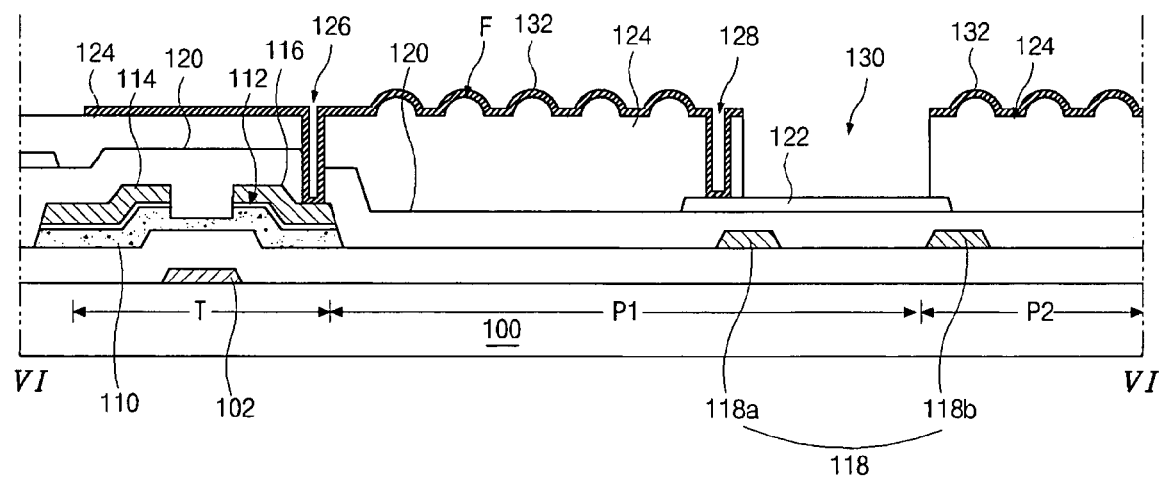

As shown in FIG. 6D, a reflective electrode 132 is formed on the second passivation layer in the reflective portion "C" 124 by depositing and patterning a reflective conductive metal, such as aluminum (Al) and silver (Ag). The reflective electrode 132 is connected to both the drain electrode 114 and the transparent electrode 122. Since the reflective electrode 132 has an unevenness corresponding to the unevenness "F" of the second passivation layer 124, high reflectance is obtained and mirror reflection is prevented. A ratio of the transmissive portion "A" to the reflective portion "C" can be changed by adjusting a space between the first branch line 118a and the second branch line 118b.

Figure 7:
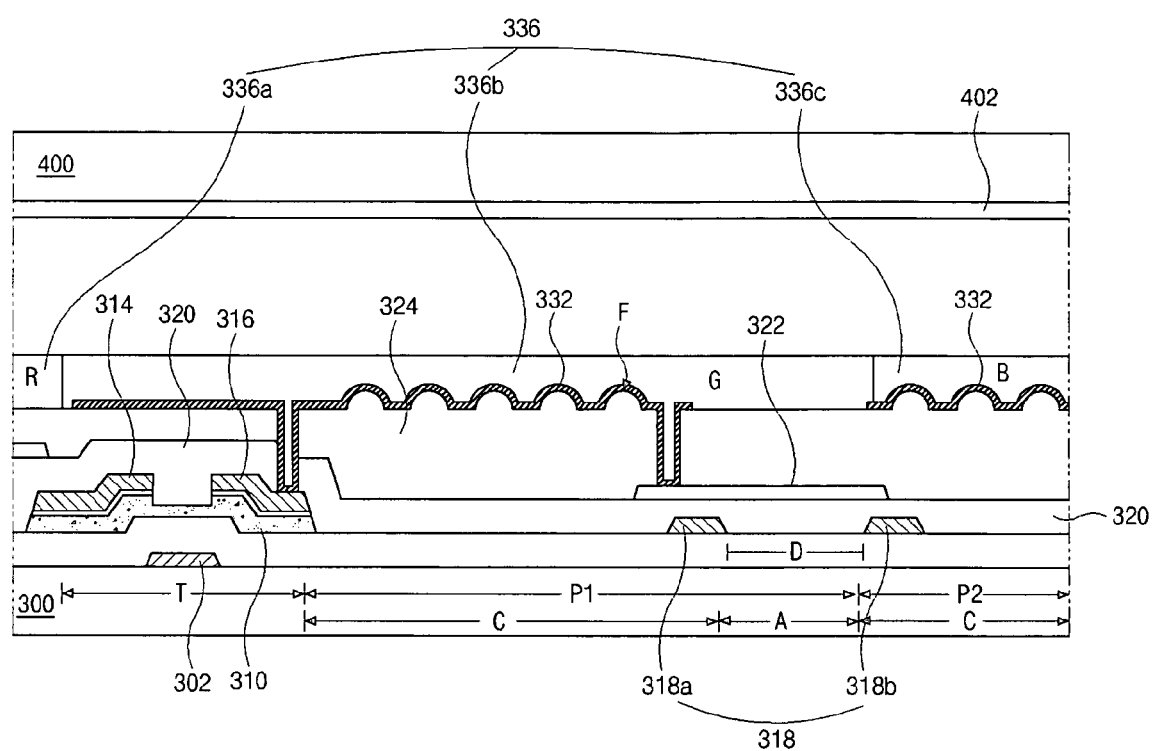
FIG. 7 is a cross-sectional view of a liquid crystal display device according to a second embodiment of the present invention.

FIG. 7 is a schematic cross-sectional view of a liquid crystal display device according to a second embodiment of the present invention. As shown in FIG. 7, a first substrate 300 and a second substrate 400 are spaced apart from each other. A thin film transistor (TFT) "T" including a gate electrode 302, an active layer 310, a source electrode 314 and a drain electrode 316 is formed on an inner surface of the first substrate 300. A gate line (not shown) connected to the gate electrode 302 crosses a data line 318 connected to the source electrode 314 to define a first pixel region "P1" and a second pixel region "P2." The data line 318 is divided into a first branch line 318a and a second branch line 318b at one end of the first substrate 300. A width of the first branch line 318a can be the same as a width of the second branch line 318b.

A first passivation layer 320 is formed on an entire surface of the first substrate 300 including the TFT "T" and the data line 318. A transparent electrode 322 is formed on the first passivation layer 320 corresponding to a space "D" between the first branch line 318a and second branch line 318b. A second passivation layer 324 is formed on the transparent electrode 322 and a reflective electrode 332 connected to the drain electrode 316 and the transparent electrode 322 is formed on the second passivation layer 324. The reflective electrode 332 can have an unevenness to increase brightness along a slant angle and to prevent mirror reflection. The unevenness can be indirectly obtained by forming the second passivation layer 324 to have an uneven portion "F" at a surface thereof.

The first branch line 318a and second branch line 318b are formed under the reflective electrodes 332 of the first pixel region "P1" and the second pixel region "P2," respectively. Since the transparent electrode 322 connected to the drain electrode 316 is formed in the space "D" between the first branch line 318a and second branch line 318b, light from a backlight unit (not shown) under the first substrate 300 passes through the space "D" and is emitted to the exterior. Accordingly, the space "D" and the reflective electrode 332 corresponds to a transmissive portion "A" and a reflective portion "C," respectively. Each pixel region "P1" and "P2" includes the transmissive portion "A" and the reflective portion "C."

A color filter layer 336, including red sub-color filter 336a, green sub-color filter 336b and blue sub-color filter 336c, is formed on the reflective electrode 332 and the second passivation layer 324 corresponding to the transmissive portion "A." One of the red sub-color filter 336a, green sub-color filter 336b and blue sub-color filter 336c corresponds to one of the pixel regions "P1" and "P2." Since the color filter layer 336 is formed on the first substrate 300, an alignment margin for attachment errors is not necessary. Accordingly, aperture ratio is further improved. A transparent common electrode 402 is formed on an inner surface of the second substrate 400. A liquid crystal layer 390 is formed between the color filter layer 336 and the common electrode 402.

Figure 8:
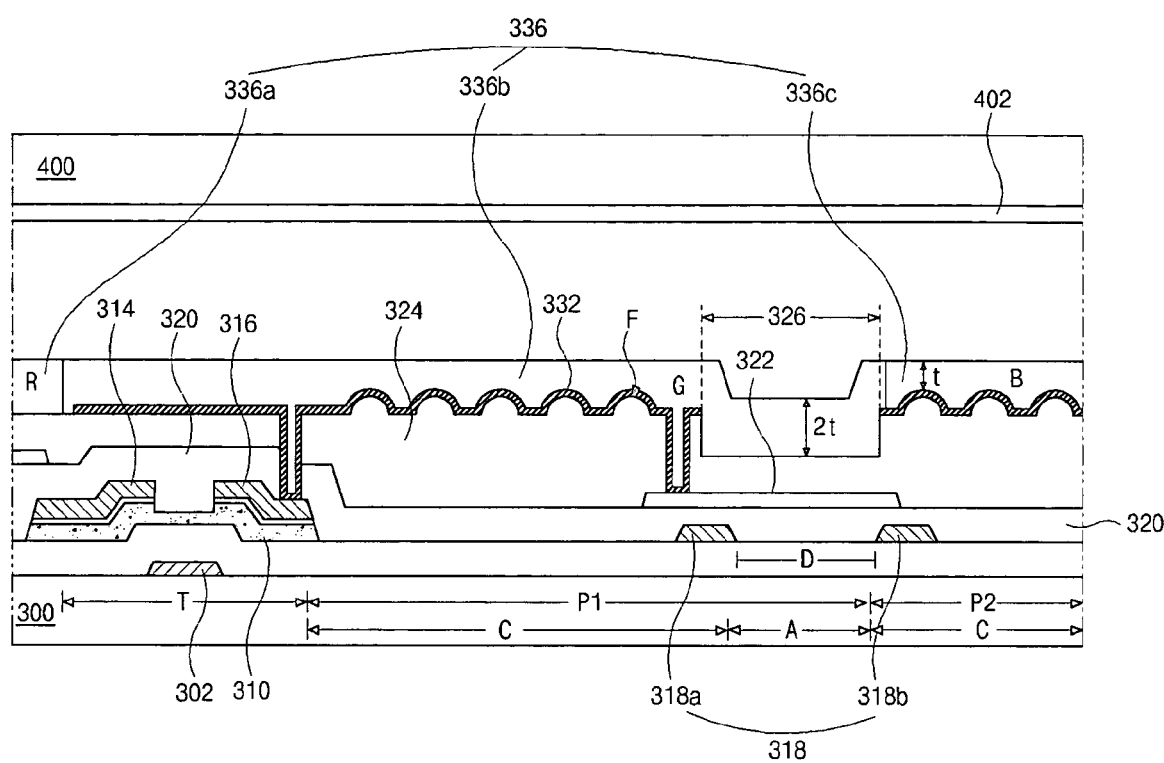
FIG. 8 is a cross-sectional view of a liquid crystal display device according to a third embodiment of the present invention.

FIG. 8 is a cross-sectional view of a liquid crystal display device according to a third embodiment of the present invention. To obtain an equal color property in the transmissive portion and the reflective portion, a liquid crystal display device including a color filter layer of a dual thickness can be used. As shown in FIG. 8, a first substrate 300 and a second substrates 400 are spaced apart from each other. A thin film transistor (TFT) "T," including a gate electrode 302, an active layer 310, a source electrode 314 and a drain electrode 316, is formed on an inner surface of the first substrate 300. A gate line (not shown) connected to the gate electrode 302 crosses a data line 318 connected to the source electrode 314 to define a first pixel region "P1" and a second pixel region "P2." The data line 318 is divided into a first branch line 318a and a second branch line 318b at one end of the first substrate 300. A width of the first branch line 318a can be the same as a width of the second branch line 318b.

A first passivation layer 320 is formed on an entire surface of the first substrate 300 including the TFT "T" and the data line 318, and a transparent electrode 322 is formed on the first passivation layer 320 corresponding to a space "D" between the first and second branch lines 318a and 318b. A second passivation layer 324 is formed on the transparent electrode 322 and a reflective electrode 332 connected to the drain electrode 316 and the transparent electrode 322 is formed on the second passivation layer 324. The reflective electrode 332 can have an unevenness to increase brightness along a slant angle and to prevent mirror reflection. The unevenness can be indirectly obtained by forming the second passivation layer 324 to have an uneven portion "F" at a surface thereof.

The first branch line 318a and the second branch line 318b are formed under the reflective electrodes 332 of the first pixel region "P1" and the second pixel region "P2," respectively. Since the transparent electrode 322 connected to the drain electrode 316 is formed in the space "D" between the first branch line 318a and the second branch line 318b, light from a backlight unit (not shown) under the first substrate 300 passes through the space "D" and is emitted to exterior. Accordingly, the space "D" and the reflective electrode 332 corresponds to a transmissive portion "A" and a reflective portion "C," respectively. Each pixel region "P1" and "P2" includes the transmissive portion "A" and the reflective portion "C."

The second passivation layer 324 has a groove 326 corresponding to the transmissive portion "A." A color filter layer 336, including red sub-color filter 336a, green sub-color filter 336b and blue sub-color filter, is formed on the reflective electrode 332 and the second passivation layer 324 corresponding to the transmissive portion "A." One of the red sub-color filter 336a, green sub-color filter 336b and blue sub-color filter 336c corresponds to one of the pixel regions "P1" and "P2." The color filter layer 336 fills the groove 326 of the second passivation layer 324, thereby a first thickness "2t" of the color filter layer 336 in the transmissive portion "A" is substantially twice as great as a second thickness "t" of the color filter layer 336 in the reflective portion "C." Therefore, a uniform color purity property can be obtained in the transmissive portion "A" and the reflective portion "C," and an LCD device having a high display quality is obtained. A transparent common electrode 402 is formed on an inner surface of the second substrate 400. A liquid crystal layer 390 is formed between the color filter layer 336 and the common electrode 402.

In an LCD device according to the second and third embodiments of the present invention, since the data line 318 is formed under the reflective electrodes 332 in the reflective portion "C" of the first and second pixel regions "P1" and "P2," a black matrix corresponding to the data line 318 can be omitted. Moreover, since the transparent electrode 322 connected to the drain electrode 316 is formed in a space "D" between the first branch line 318a and the second branch line 318b, a black matrix corresponding to the space "D" can also be omitted. In addition, since the space between the first branch line 318a and the second branch line 318b is used as the transmissive portion "A," aperture ratio and brightness are further improved. Moreover, since the color filter layer 336 is formed on the first substrate 300, an alignment margin for accommodating attachment errors is not necessary and aperture ratio is further improved. In an LCD device according to the third embodiment of the present invention, since the color filter layer has a dual thickness such that a first thickness in the transmissive portion "A" is substantially twice as great as a second thickness in the reflective portion "C," a uniform color purity property resulting in an LCD device having a high display quality can be obtained in the transmissive portion "A" and the reflective portion "C."

In an LCD device according to the present invention, a data line is divided into first and second branch lines, and the first and second branch lines are disposed in reflective portions of adjacent pixel regions. As a result, a black matrix corresponding to the data line can be omitted by utilizing a space between the first and second branch lines as a transmissive portion. Accordingly, aperture ratio and brightness are improved. Moreover, when the LCD device includes a groove in the transmissive portion, a liquid crystal layer can have a first thickness (i.e., a first cell gap) in the transmissive portion and a second thickness (i.e., a second cell gap) in the reflective portion such that the first thickness is substantially twice as great as the second thickness. In an LCD device having a dual cell gap structure, since a uniform optical property is obtained in the transmissive portion and the reflective portion, a high display quality is obtained. In addition, since a color filter layer is formed on an array substrate, alignment margin for accommodating attachment errors is not necessary and aperture ratio is further improved. Furthermore, an LCD device having uniform color property in the transmissive portion and the reflective portion and high display quality can be obtained by forming a color filter layer such that a first thickness of the color filter layer in the transmissive portion is substantially twice as great as a second thickness of the color filter layer in the reflective portion.

It will be apparent to those skilled in the art that various modifications and variations can be made in the liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   a gate line on the substrate;
   a data line crossing the gate line to define a pixel region
      including a transmissive portion and a reflective portion, the data line being divided into first and second branch lines, the first and second branch lines being spaced apart from each other and disposed in the reflective portion of the adjacent pixel regions, respectively;

a thin film transistor connected to the gate line and the data line;

a reflective electrode corresponding to the reflective portion and covering the first and second branch lines; and a transparent electrode corresponding to the transmissive portion and connected to the reflective electrode.

2. The substrate according to claim 1, wherein a width of the first branch line is substantially the same as a width of the second branch line.

3. The substrate according to claim 1, wherein the thin film transistor includes a gate electrode connected to the gate line, an active layer, a source electrode connected to the data line, a drain electrode connected to the reflective electrode.

4. The substrate according to claim 3, wherein the active layer includes amorphous silicon (a-Si:H).

5. The substrate according to claim 1, wherein the reflective electrode has at least one of silver (Ag), aluminum (Al) and aluminum (Al) alloy.

6. The substrate according to claim 1, wherein a surface of the reflective electrode has an unevenness.

7. The substrate according to claim 1, wherein the transparent electrode has one of indium-tin-oxide (ITO) and indium-zinc-oxide (IZO).

8. The substrate according to claim 1, wherein a space between the first and second branch lines corresponds to the transmissive portion.

9. The substrate according to claim 1, further comprising a passivation layer between the transparent electrode and the reflective electrode.

10. The substrate according to claim 9, wherein the passivation layer includes a groove corresponding to the transmissive portion.

11. The substrate according to claim 1, further comprising a color filter layer on the reflective electrode.

12. The substrate according to claim 11, wherein one of red, green and blue sub-color filters in the color filter layer corresponds to the pixel region.

13. The substrate according to claim 11, wherein the color filter layer has a first thickness in the transmissive portion and a second thickness in the reflective portion, the first thickness being substantially twice as great as the second thickness.

14. The substrate according to claim 11, further comprising a passivation layer between the transparent electrode and the reflective electrode.

15. The substrate according to claim 14, wherein the passivation layer includes a groove corresponding to the transmissive portion.

16. A fabricating method of an array substrate for a liquid crystal display device, comprising:

forming a gate line on a substrate;

forming a data line crossing the gate line to define a pixel region including a transmissive portion and a reflective portion, the data line being divided into first and second branch lines, the first and second branch lines being spaced apart from each other and disposed in the reflective portion of the adjacent pixel regions, respectively;

forming a thin film transistor connected to the gate line and the data line;

forming a reflective electrode corresponding to the reflective portion and covering the first and second branch lines; and forming a transparent electrode corresponding to the transmissive portion and connected to the reflective electrode.

17. The method according to claim 16, wherein a width of the first branch line is substantially the same as a width of the second branch line.

18. The method according to claim 16, wherein the thin film transistor includes a gate electrode connected to the gate line, an active layer, a source electrode connected to the data line, a drain electrode connected to the reflective electrode.

19. The method according to claim 16, wherein the reflective electrode has at least one of silver (Ag), aluminum (Al) and aluminum (Al) alloy.

20. The method according to claim 16, wherein a surface of the reflective electrode has an unevenness.

21. The method according to claim 16, wherein the transparent electrode has one of indium-tin-oxide (ITO) and indium-zinc-oxide (IZO).

22. The method according to claim 16, wherein a space between the first and second branch lines corresponds to the transmissive portion.

23. The method according to claim 16, further comprising forming a passivation layer between the transparent electrode and the reflective electrode.

24. The method according to claim 23, wherein the passivation layer includes a groove corresponding to the transmissive portion.

25. The method according to claim 16, further comprising forming a color filter layer on the reflective electrode.

26. The method according to claim 25, wherein one of red, green and blue sub-color filters in the color filter layer corresponds to the pixel region.

27. The method according to claim 25, wherein the color filter layer has a first thickness in the transmissive portion and a second thickness in the reflective portion, the first thickness being substantially twice as great as the second thickness.

28. The method according to claim 25, further comprising forming a passivation layer between the transparent electrode and the reflective electrode.

29. The method according to claim 28, wherein the passivation layer includes a groove corresponding to the transmissive portion.

* * * * *